United States Patent
Ptacek et al.

(10) Patent No.: US 9,973,091 B2
(45) Date of Patent: May 15, 2018

(54) PRECISE AND DYNAMIC CONTROL OF SYNCHRONOUS RECTIFICATION SWITCH VOLTAGE IN A SWITCHED MODE POWER SUPPLY

(71) Applicant: SEMICONDUCTOR COMPONENTS INDUSTRIES, LLC, Phoenix, AZ (US)

(72) Inventors: Karel Ptacek, Roznov pod Radhostem (CZ); Tomas Tichy, Jihlava (CZ)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 123 days.

(21) Appl. No.: 14/596,980

(22) Filed: Jan. 14, 2015

(65) Prior Publication Data
US 2016/0204701 A1    Jul. 14, 2016

(51) Int. Cl.
*H02M 3/158*    (2006.01)

(52) U.S. Cl.
CPC ....... *H02M 3/1588* (2013.01); *Y02B 70/1466* (2013.01)

(58) Field of Classification Search
None
See application file for complete search history.

(56) References Cited

U.S. PATENT DOCUMENTS

| | | | | |
|---|---|---|---|---|
| 9,293,990 B2* | 3/2016 | Takada | ........ | H02M 3/156 |
| 2005/0128776 A1* | 6/2005 | Dequina | ........ | H02M 1/088 |
| | | | | 363/89 |
| 2008/0203994 A1* | 8/2008 | Park | ........ | G05F 1/67 |
| | | | | 323/318 |
| 2010/0166436 A1* | 7/2010 | Hase | ........ | H04B 10/564 |
| | | | | 398/182 |
| 2010/0201336 A1* | 8/2010 | Chen | ........ | H02M 3/1588 |
| | | | | 323/285 |
| 2012/0105045 A1* | 5/2012 | Burns | ........ | H02M 1/38 |
| | | | | 323/311 |
| 2013/0328610 A1* | 12/2013 | Hayashi | ........ | H03K 3/013 |
| | | | | 327/310 |
| 2014/0085952 A1* | 3/2014 | Ptacek | ........ | H02M 1/08 |
| | | | | 363/127 |
| 2014/0225583 A1* | 8/2014 | Huang | ........ | H02M 1/44 |
| | | | | 323/283 |

* cited by examiner

*Primary Examiner* — Jeffrey Gblende
(74) *Attorney, Agent, or Firm* — Conley Rose, P.C.

(57) ABSTRACT

A switched mode power supply, in some embodiments, comprises a synchronous rectification transistor switch including a gate, and it further comprises an output driver coupled to the gate and providing a driving signal to the gate. The driving signal is determined based on a dynamically controllable clamp signal and a prior driving signal.

20 Claims, 4 Drawing Sheets

PRECISE AND DYNAMIC CONTROL OF SYNCHRONOUS RECTIFICATION SWITCH VOLTAGE IN A SWITCHED MODE POWER SUPPLY

BACKGROUND

Switched mode power supplies (SMPS) are electronic power supplies that convert power more efficiently than traditional power supplies. Unlike these other power supplies, SMPS use switching regulators to repeatedly switch between low-power-dissipation on and off states and to avoid high-power-dissipation states altogether, thereby conserving energy. For example, the power stage of a SMPS—which performs voltage rectification—may use one or more metal oxide semiconductor field effect transistor (MOSFET) switches in lieu of (or in tandem with) traditional, standard diodes or Schottky rectifiers, thus taking advantage of the relatively low voltage drop associated with the MOSFETs to increase energy efficiency. Such use of MOSFETs in SMPS power stages is called "synchronous rectification" (SR).

Despite their superior energy efficiency, the use of SR MOSFETs still presents multiple difficulties as a result of the application of inappropriate voltages to the MOSFET gates. For instance, during light load conditions the current draw from the SMPS is low, and in such conditions it may be advantageous to stop MOSFET switching or to at least reduce the MOSFET gate input voltage. Current SMPS, however, do not provide the ability to dynamically adjust the MOSFET gate input voltage to an appropriate level and to subsequently maintain that level. Similarly, if a SMPS power stage uses a SR MOSFET in tandem with a traditional diode or Schottky rectifier, the transition between standard rectification and synchronous rectification should be carefully controlled so that it is gradual and even, avoiding sudden voltage spikes that can result in system instability. This, too, may be accomplished by precisely and dynamically controlling the MOSFET gate input voltage. Such precise, dynamic voltage control may also prevent damage to MOSFET switches, such as gallium nitride FETs that have very low threshold voltages required for current to flow between source and drain. As mentioned, however, at present there is no suitable technique for precisely and dynamically adjusting and subsequently maintaining the gate input voltage provided to SR MOSFETs in the context of SMPS power stages.

SUMMARY

At least some of the embodiments disclosed herein are directed to a switched mode power supply comprising: a synchronous rectification transistor switch including a gate; and an output driver coupled to said gate and providing a driving signal to the gate, said driving signal determined based on a dynamically controllable clamp signal and a prior driving signal. Such embodiments may be supplemented in a variety of ways, including by adding any of the following concepts in any sequence and in any combination: wherein the output driver comprises a storage element that provides said prior driving signal; wherein the clamp signal is determined based on electrical characteristics of the transistor switch; wherein the clamp signal is determined based on a threshold voltage range at said gate; wherein the clamp signal is determined based on an output current of the power supply; wherein the output driver generates a regulation signal that is used in tandem with a pulse signal to generate the driving signal; wherein the output driver uses the clamp signal, said prior driving signal, and a prior regulation signal to generate said regulation signal; wherein the prior driving and regulation signals are obtained from storage elements using switches that are opened and closed based on said pulse signal; wherein, to generate the regulation signal, the output driver determines a sum of the prior regulation signal and a product, said product determined by multiplying a constant by a difference between the clamp signal and said prior driving signal; and wherein said clamp signal and said driving signal have voltages that are less than a power supply rail voltage provided to the output driver.

At least some embodiments are directed to an output driver for controlling a synchronous rectification transistor switch, comprising: controller logic that, at a first time instance, receives and uses a dynamically controllable setpoint signal, a prior driving signal, and a prior regulation signal to generate a new regulation signal that is stored in a storage element; and out stage logic that, at a next time instance, receives and uses said new regulation signal from the storage element and a pulse signal to generate a new driving signal usable to control said synchronous rectification transistor switch. Such embodiments may be supplemented in a variety of ways, including by adding any of the following concepts in any sequence and in any combination: further comprising limiter logic that receives and uses a dynamically controllable clamp signal and a rail voltage signal to generate said setpoint signal, the generated setpoint signal associated with a lesser of the clamp and rail voltage signals; wherein said setpoint signal is a dynamically controllable clamp signal; further comprising second and third storage elements that store the prior driving and regulation signals, respectively; further comprising a first switch coupled between said controller logic and said first storage element, a second switch coupled in series between the out stage logic and the second storage element, and a third switch coupled in series between the third storage element and a node to which the first storage element couples; wherein the first switch is open when the second and third switches are closed, and wherein the first switch is closed when the second and third switches are open; wherein: the first, second and third switches are controlled by said pulse signal, when the pulse signal opens the first switch and closes the second and third switches, the out stage logic determines said new driving signal based on the new regulation signal stored in the storage element, and when the pulse signal closes the first switch and opens the second and third switches, the out stage logic determines said new driving signal using ground; and wherein, to determine the new regulation signal, the controller logic determines a sum of the prior regulation signal and a product, the product being a result of multiplying a constant by a difference between the dynamically controllable setpoint signal and the prior driving signal.

At least some embodiments are directed to an output driver for controlling a transistor switch in a switched mode power supply, comprising: controller logic having a controller output coupled to a first switch that couples to a first storage element; out stage logic having an out stage input coupled to said first storage element, a different out stage input receiving a pulse signal, and an out stage output coupled to a second switch that couples to a second storage element, said second storage element couples to a controller input, wherein the first storage element couples to a third switch that couples to a third storage element, the third storage element couples to another controller input, wherein, when the first switch is closed and the second and third switches are open, the controller logic uses a dynamically controllable setpoint signal, a voltage of the second storage element and a voltage of the third storage element to generate a regulation signal that is provided to the first storage element via the controller output and the first switch; wherein, when the first switch is open and the second and third switches are closed, a voltage of the first storage element is provided to said third storage element via the third switch and to said out stage input, the out stage logic provides a driving signal on the out stage output based on the voltage of the first storage element and said pulse signal, and said driving signal is provided to the second storage element, and wherein the driving signal is usable to control a switched mode power supply switch. Such embodiments may be supplemented in a variety of ways, such as by including the following concept: further comprising limiter logic that receives a dynamically controllable clamp signal and a rail voltage signal and provides the setpoint signal to said controller logic based on a lesser of the dynamically controllable clamp signal and the rail voltage signal.

BRIEF DESCRIPTION OF THE DRAWINGS

There are disclosed in the drawings and in the following description specific systems for the precise and dynamic control of synchronous rectification switch voltages in switched mode power supplies. In the drawings.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Disclosed herein are systems for the precise and dynamic control of synchronous rectification switch voltages in switched mode power supplies. More precisely, these systems are directed to output drivers that couple to and control synchronous rectification (SR) transistor switches in switched mode power supplies (SMPS). Because the disclosed output drivers include dynamically controllable clamp signals and discretized feedback loops, they supply driving voltages to SMPS transistor switches with a high degree of precision, and, further, they maintain such precise driving voltages. As a result, the disclosed output drivers increase energy efficiency (e.g., by achieving and maintaining low driving voltages in low-load conditions) and miti-gate potential damage to switches caused by dramatic variations in driving voltage (e.g., voltage spikes).

Figure 1A:
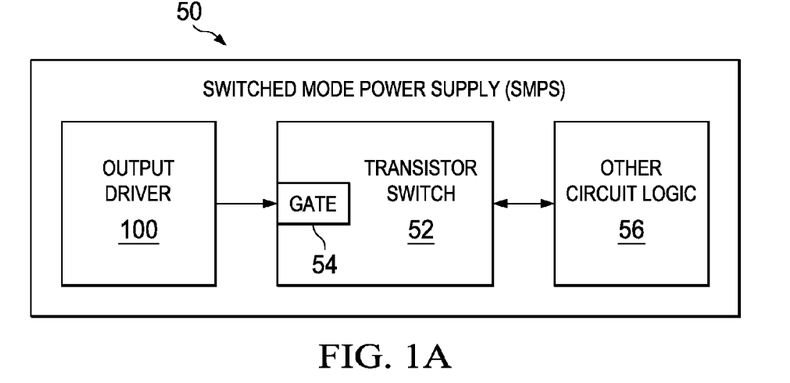
FIG. 1A is a conceptual block diagram of a switching mode power supply including an output driver to precisely and dynamically control a synchronous rectification transistor switch.

FIG. 1A is a conceptual block diagram of a SMPS including an output driver to precisely and dynamically control a synchronous rectification transistor switch. In particular, the FIG. 1A shows a SMPS 50 that includes a synchronous rectification transistor switch (e.g., MOSFET) 52 having a gate 54. The switch 52 couples to other circuitry 56 in the SMPS, the precise nature of which is not described here. The gate 54 of the switch 52 (and, by extension, the switch itself) is controlled by an output driver 100 that functions in accordance with the embodiments described herein.

Figure 1B:
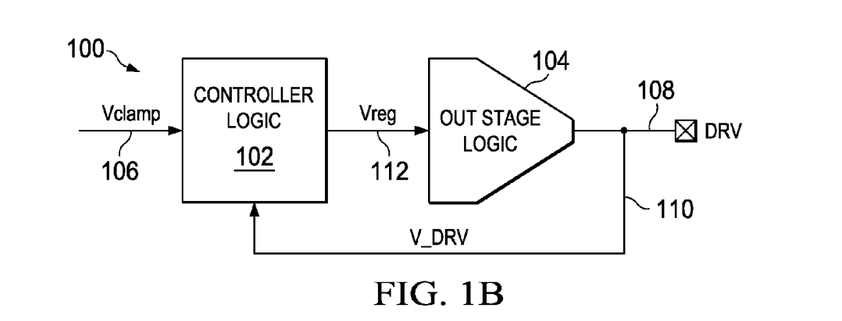
FIG. 1B is a conceptual schematic of an output driver used to precisely and dynamically control the voltage applied to a synchronous rectification switch.

FIG. 1B is an illustrative, conceptual schematic of an output driver used to precisely and dynamically control the voltage applied to a synchronous rectification switch. The output driver 100 includes controller logic 102, out stage logic 104, a dynamically controllable clamp signal 106 ($V_{CLAMP}$), a driving (output) signal 108 (DRV), a prior driving signal 110 ($V_{DRV}$), and a regulation signal 112 ($V_{REG}$). Although the schematic of FIG. 1B is purely conceptual, it describes the disclosed systems' general principle of operation. Specifically, the clamp signal 106 is a setpoint signal, meaning that its voltage is the desired value for the driving signal 108. The clamp signal 106 is dynamically controllable—for example and without limitation, by a trimming device located within the SMPS, by an internal or external signal coupled to an external pin, or by any other suitable technique. The clamp signal 106 may be set and modified manually, automatically, or some combination thereof. In general, the clamp signal 106 is set and modified according to the particular circumstances of the application within which the SMPS is deployed. In certain situations, for instance, a relatively low driving signal 108 is required (e.g., low load conditions; gallium nitride FETs with low threshold voltages), and in these situations, the clamp signal 106 may be dynamically decreased so that the setpoint for the driving signal 108 decreases. In other cases, the driving voltage 108 may require a gradual increase (e.g., transitioning between the SR transistor switch and a traditional diode or Schottky rectifier), and in such circumstances the clamp signal 106 may be increased at a rate and to an amount that is consistent with the energy efficiency and switch damage prevention requirements of the application. In many cases, it may be desirable for the driving signal 108 to be less than the supply rail provided to the output driver 100. For example, in at least FIGS. 2-4 a supply rail $V_{CC}$ is described. This $V_{CC}$ may be, for example, 20 volts, but it may be desirable for the driving signal 108 to be a value less than 20 volts—for instance, 5 volts—and to be maintained at this lower voltage. The clamp signal 106 may thus be set to 5 volts so that the driving signal 108 is generated accordingly.

The speed at which the output driver 100 (and, by extension, the driving signal 108) responds to adjustments to the clamp signal 106 depends at least in part on the architecture of the controller logic 102. This architecture, described below with respect to FIG. 5, may be adjusted as desired depending on the particular application in which the SMPS is deployed so as to implement an output driver 100 response speed that accounts for the expected variations in the clamp signal 106 and for the electrical characteristics of the transistor switch (or diode/rectifier) being driven by the output driver 100.

The controller logic 102 receives the clamp signal 106, and it also receives a prior driving signal 110. As explained with respect to the circuit schematics of FIGS. 2 and 3 below, the output driver 100 is time-discretized, so at time t, the prior driving signal 110 is a version of the driving signal 108 that was output by the out stage logic 104 at time t−1. (As explained, FIG. 1B is a purely conceptual schematic and thus omits the time-discretization circuitry that is included in FIGS. 2 and 3.) The prior driving signal 110 forms a feedback loop from the out stage logic 104 and the controller logic 102. Thus, the controller logic 102 compares the prior driving signal 110 to the clamp signal 106 to determine the difference between the two signals. This difference reflects the degree of error between the actual output voltage of the output driver 100 and the desired setpoint value of the output as indicated by the clamp signal 106. The controller logic 102 uses this difference to produce a regulation signal 112 that is provided to the out stage logic 104. The out stage logic 104 receives and uses the regulation signal 112 to adjust the driving signal 108 so that the driving signal 108 trends toward the setpoint as indicated by the clamp signal 106.

Figure 2:
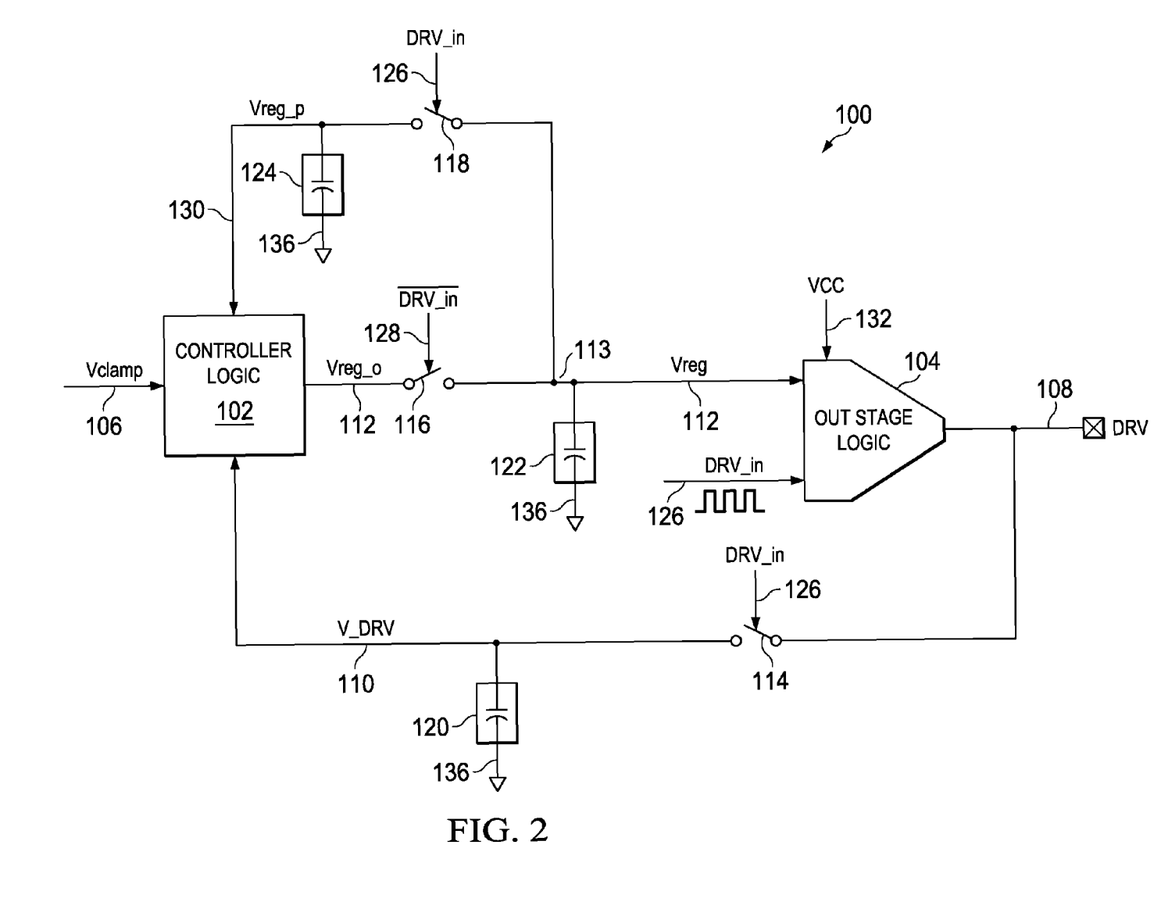
FIG. 2 is a circuit schematic of an output driver used to precisely and dynamically control the voltage applied to a synchronous rectification switch.

FIG. 2 is an illustrative circuit schematic of the output driver 100 used to precisely and dynamically control the voltage applied to a synchronous rectification switch. As described with respect to FIG. 1B, the output driver 100 includes the controller logic 102, the out stage logic 104, the dynamically controllable clamp signal 106, a driving signal 108, a prior driving signal 110, a regulation signal 112 (labeled as $V_{REG\_O}$ or $V_{REG}$ depending on the status of a switch 116), node 113, switches 114, 116 and 118, storage elements 120, 122 and 124 (e.g., a capacitor of a value on the order of 1-100 pico-Farads), a pulse signal 126 (DRV_in) and an inverse of the pulse signal 128, a prior regulation signal 130, a $V_{CC}$ power supply rail 132, and ground connections 136.

The dynamically controllable clamp signal 106 is provided to the controller logic 102, as is the prior driving signal 110 and the prior regulation signal 130. The controller logic 102 outputs the regulation signal 112 (also referred to as the "new regulation signal"). The regulation signal 112 is labeled as $V_{REG\_O}$ and $V_{REG}$ in FIG. 2. For clarity, the regulation signal 112 is defined as the voltage at the node 113 at any given point in time. Thus, when the switch 116 is closed, the voltage at node 113 is equivalent to the $V_{REG\_O}$ signal output by the controller logic 102, and so the regulation signal 112 is equivalent to $V_{REG\_O}$. When the switch 116 is open, the voltage at node 113 is equivalent to the value of the storage element 122, and so the regulation signal 112 is equivalent to $V_{REG}$. The storage element 122 couples to ground 136 and to the node 113. The regulation signal $V_{REG}$ is provided to the out stage logic 104, as is the pulse signal 126 and supply rail 132. The out stage logic 104 outputs the driving signal 108. The output of the out stage logic 104 couples to the switch 114, which is opened and closed by pulse signal 126. The switch 114 couples to the storage element 120, which, in turn, couples to ground 136. The storage element 120 further couples to the controller logic 102, and the prior driving signal 110 is carried between the storage element 120 and the controller logic 102 along this coupling. The switch 118 couples to node 113 and to storage element 124, which, in turn, couples to ground 136. The storage element 124 also couples to the controller logic 102, and the prior regulation signal 130 is carried between the storage element 124 and the controller logic 102 along this coupling. Because the circuit schematic of FIG. 3 is similar to that of FIG. 2, the FIG. 3 schematic is now described, and then the operation of the circuits shown in FIGS. 2 and 3 are described together.

Figure 3:
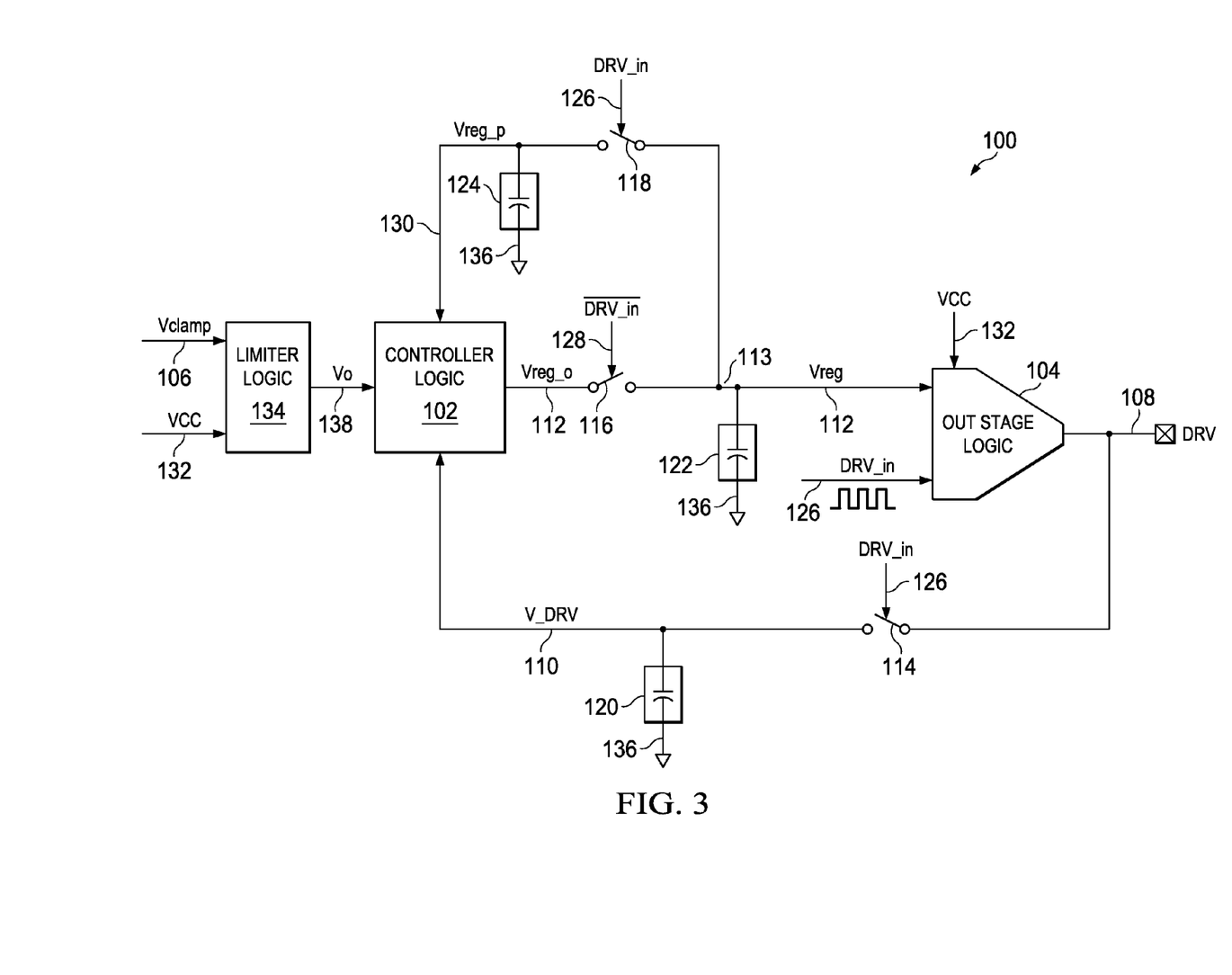
FIG. 3 is an alternative version of the circuit schematic of FIG. 2 modified to include limiter logic that prevents saturation of the output driver controller logic.

FIG. 3 is an illustrative, alternative embodiment of the output driver 102 that includes limiter logic to prevent saturation of the output driver controller logic 102. Specifically, referring to FIG. 3, the output driver 100 includes limiter logic 134. The limiter logic 134 receives the dynamically controllable clamp signal 106 and $V_{CC}$ supply rail 132. Based on the clamp signal 106 and the $V_{CC}$ supply rail 132, the limited logic 134 produces a control signal 138 ($V_O$), which is provided to the controller logic 102. The control signal 138 is provided to the controller logic 102 (as shown in FIG. 3) in lieu of a direct provision of the clamp signal 106 to the controller logic 102 (as shown in FIG. 2). In general, the term "setpoint signal" may be used to refer to the dynamically controllable signal that the controller logic 102 receives (e.g., the control signal 138, the clamp signal 106) to serve as a setpoint for the driving signal 108. The scope of disclosure is not limited to any particular technique for providing a dynamically controllable setpoint signal to the controller logic 102. Any and all variations of the embodiments shown in FIGS. 2 and 3 are contemplated and fall within the scope of this disclosure. The operation of FIGS. 2 and 3 are now described in turn.

Referring again to FIG. 2, and as described above, the output driver 100 is a time-discretized system. Accordingly, when the pulse signal 126 is low, and switches 114, 116 and 118 are open, closed and open, respectively, the controller logic 102 performs the following actions. First, the controller logic 102 receives the dynamically controllable clamp signal 106, a prior driving signal 110 and a prior regulation signal 130. The prior driving signal 110 is obtained from the storage element 120, and the prior regulation signal 130 is obtained from the storage element 124. (The manner in which the prior driving signal 110 and prior regulation signal 130 are stored in the storage elements is described below.) The controller logic 102 then determines a difference between the clamp signal 106 and the prior driving signal 110. This difference represents the degree of error present in the driving signal 108 relative to the desired setpoint value reflected by the clamp signal 106. The controller logic 102 optionally multiplies this difference by a constant value that indicates the desired response speed of the output driver 100. A higher constant value results in a relatively faster correction of the driving signal 110 toward the clamp signal 106, and a lower constant value results in a relatively slower correction. The controller logic 102 subsequently sums the product with the value of the prior regulation signal 130. The sum is the new regulation signal 112, labeled as $V_{REG\_O}$ in FIG. 2. The actions of the controller logic 102 may be described by the following equation:

$$V_{REG\_O} = K(V_{CLAMP} - V_{DRV}) + V_{REG\_P} \quad (1)$$

where $V_{REG\_O}$ is the regulation signal 112 produced by the controller logic 102, K is the constant that defines the speed of the system response to differences between the clamp signal 106 and the driving signal 108 (in some embodiments, an optimal value for K is 0.67), $V_{CLAMP}$ is the clamp signal 106, $V_{DRV}$ is the prior driving signal 110, and $V_{REG\_P}$ is the prior regulation signal 130.

Because the pulse signal 126 is low and switch 116 is closed, the regulation signal 112 ($V_{REG\_O}$) is provided to the storage element 122, and the storage element 122 is charged to store the voltage of the regulation signal 112. The regulation signal 112 ($V_{REG\_O}$) is not, however, used by the out stage logic 104, because when the pulse signal 126 is low the driving signal 108 output by the out stage logic 104 is zero (i.e., ground). Additionally, when the pulse signal 126 is low, the switch 118 is open, so the regulation signal 112 $V_{REG\_O}$—although present at node 113—is not provided to the storage element 124 or the controller logic 102.

The pulse signal 126 then switches from low to high. When this occurs, the switch 116 opens and the switches 114 and 118 close. Thus, the output node of the controller logic 102 ($V_{REG\_O}$) is no longer coupled to the node 113. Accordingly, the regulation signal 112 that is present at node 113 when pulse signal 126 is high is the value of the storage element 122, which, as explained above, was charged to $V_{REG\_O}$ when the switch 116 was closed. The storage element 122 thus feeds the regulation signal 112 ($V_{REG}$) to the out stage logic 104. The out stage logic 104 uses the $V_{REG}$ signal and the pulse signal 126 to determine the driving signal 108. As explained below, the out stage logic 104 clamps the driving signal 108 as tightly as possible to the $V_{REG}$ signal.

Having been produced, the driving signal 108 is provided to the SMPS SR transistor switch (e.g., MOSFET) to which the output driver 100 couples. The driving signal 108 is also provided back to the controller logic 102 in the form of a delayed, time-discretized feedback loop. Specifically, when the pulse signal 126 is high and switch 114 is closed, the driving signal 108 is being produced by the out stage logic 104 and charges the storage element 120 to the voltage of the driving signal 108. Although the storage element 120 couples to the controller logic 102, the controller logic 102 does not use the driving signal 108 because the switch 116 is open and, therefore, the controller logic 102 cannot provide output to any part of the output driver 100.

In addition, when the pulse signal 126 is high, the switch 118 is closed. Thus, the regulation signal 112 ($V_{REG}$) is provided to the storage element 124 to charge the storage element to the voltage of the regulation signal 112. Although switch 118 is closed and the node 113 couples directly to the controller logic 102, the controller logic 102 does not use the regulation signal 112 ($V_{REG}$) to determine an output, since switch 116 is open.

At this point in time, the storage elements 120 and 124 are both charged to the voltages of the driving signal 108 and the regulation signal 112 ($V_{REG}$), respectively, while the voltage of the storage element 122 is provided to the out stage logic 104. The value of the storage element 120 reflects the current driving signal 108, and the value of the storage element 124 reflects the current regulation signal 112 ($V_{REG}$). The pulse signal 126 then changes again from high to low. As a result, switches 114 and 118 open, disconnecting the storage elements 120 and 124 from the driving signal 108 and the regulation signal 112 ($V_{REG}$), respectively. Thus, because switches 114 and 118 are open, and further because the switch 116 is closed and is providing a new regulation signal 112 ($V_{REG\_O}$) from the controller logic 102 to the storage element 122, the value of the storage element 124 is referred to as the "prior" regulation signal 130, and the value of the storage element 120 is referred to as the "prior" driving signal 110. These "prior" signals 110, 130 are provided to and used by the controller logic 102, in tandem with the clamp signal 106, to generate the regulation signal 112 ($V_{REG\_O}$) as described above, and the process then repeats itself.

As described below, the out stage logic 104 uses the supply rail 132 to produce the driving signal 108, and the out stage logic 104 cannot produce a driving signal 108 that exceeds the supply rail 132. In some cases, the clamp signal 106 may overrun the $V_{CC}$ supply rail 132, meaning that the clamp signal 106 is higher than the supply rail 132. In such cases, the out stage logic 104 produces a driving signal 108 equivalent to the supply rail 132, but because the clamp signal 106 is higher than the supply rail 132, the controller logic 102 continually determines that the driving signal 108 is not high enough. Thus, the controller logic 102 is saturated. To prevent this condition, the embodiment shown in FIG. 3 introduces the limiter logic 134. The limiter logic 134 receives the dynamically controllable clamp signal 106 and supply rail 132 and determines a control signal 138 ($V_O$) that is based on the lesser of the two signals 106, 132. In this way, when the clamp signal 106 is less than or equal to the supply rail 132, the control signal 138 reflects the voltage of the clamp signal 106. When the clamp signal 106 is greater than the supply rail 132, the control signal 138 reflects the voltage of the supply rail 132. In general, the term "setpoint signal" may be used to refer to either the dynamically controllable clamp signal 106 that is provided directly to the controller logic 102 (as in FIG. 2) or to the dynamically controllable control signal 138 ($V_O$) that is provided to the controller logic 102 and that is based on one or more of the dynamically controllable clamp signal 106 and the supply rail 132 (as in FIG. 3).

Figure 4:
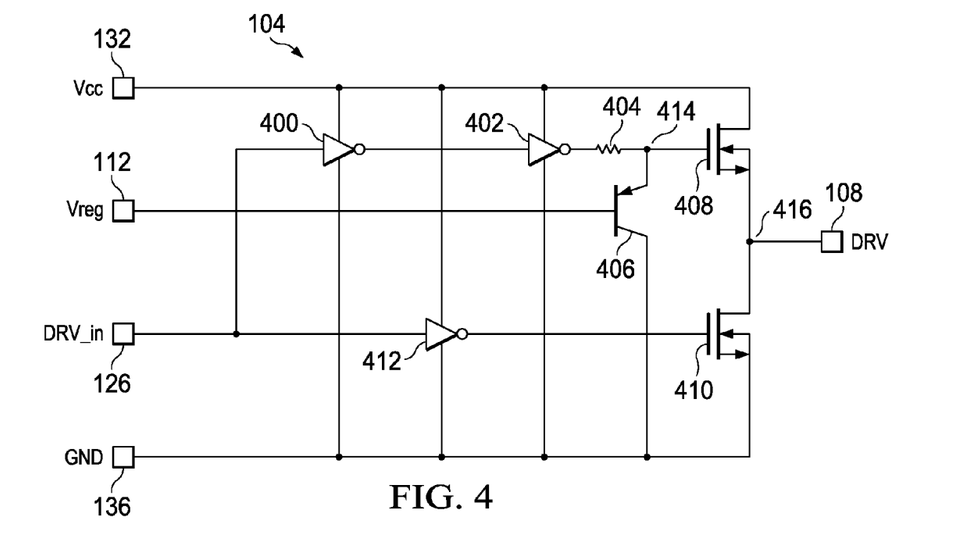
FIG. 4 is a circuit schematic of output driver out stage logic.

FIG. 4 is an illustrative circuit schematic of output driver out stage logic 104. The out stage logic 104 receives the $V_{CC}$ supply rail 132, the regulation signal 112, the pulse signal 126 and ground 136. The out stage logic 104 outputs the driving signal 108. The out stage logic 104 includes inverters 400, 402 and 412; a resistor 404; a transistor (e.g., bipolar junction transistor) 406; another transistor (e.g., MOSFET) 408; and still another transistor (e.g., MOSFET) 410. The inverters 400, 402 are supplied by the supply rail 132 and couple to ground 136. The input of the inverter 400 couples to pulse signal 126, and its output couples to the input of inverter 402. The output of inverter 402 couples in series with resistor 404, and the resistor 404 also couples to a node 414. The emitter of transistor 406 couples to node 414, as does the gate of transistor 408. The drain of the transistor 408 couples to the supply rail 132, and the source of the transistor 408 couples to node 416 at which the driving signal 108 is produced. The base of transistor 406 couples to the regulation signal 112 and the collector of the transistor 406 couples to ground 136. The inverter 412 is supplied by supply rail 132 and couples to ground 136. The input of the inverter 412 couples to the pulse signal 126 and the output of the inverter 412 couples to the gate of the transistor 410. The drain of the transistor 410 couples to node 416 and the source of the transistor 410 couples to ground 136.

In operation, when the pulse signal 126 is low, the gate of transistor 410 is high and the transistor 410 is on, and the gate of transistor 408 is low and the transistor 408 is off. Because transistor 410 is on and couples to ground 136, the node 416 (and, therefore, the driving signal 108) is pulled low. Conversely, when the pulse signal 126 is high, the gate of transistor 410 is low and the transistor 410 is off, and the gate of transistor 408 is high and the transistor 408 is turned on. The transistor 408 is a source follower, meaning that its source voltage at node 416 is essentially the same as its gate voltage at node 414 (with a slight degree of difference attributable to the threshold voltage of the transistor 408). The gate voltage of the transistor 408 at node 414 is clamped to the regulation signal 112 voltage by transistor 406 (with a slight degree of difference attributable to the voltage drop between base and emitter of the transistor 406). Thus, when the pulse signal 126 is high, the driving signal 108 is almost identical to the regulation signal 112, with slight differences attributed to the threshold voltage across the transistor 408 and voltage drop across the transistor 406. The resistor 404 limits the current flowing through the inverter 402 and the transistor 406. The schematic shown in FIG. 4 does not limit the scope of the disclosure, and other circuit configurations that accomplish the objectives of the out stage logic 104 as described here are contemplated and fall within the scope of the disclosure.

Figure 5:
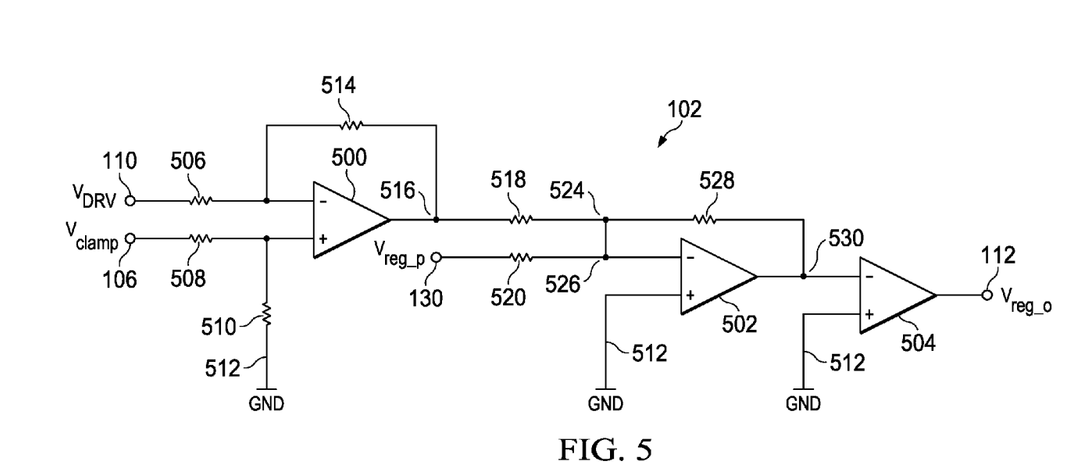
FIG. 5 is a circuit schematic of output driver controller logic.

FIG. 5 is an illustrative circuit schematic of output driver controller logic 102. The controller logic 102 receives the prior driving signal 110, the clamp signal 106 and the prior regulation signal 130 as inputs and provides the regulation signal 112 ($V_{REG\_O}$) as an output. The controller logic 102 includes operational amplifiers 500, 502, and 504. Resistor 506 couples to the inverting input of the amplifier 500 and resistors 508, 510 couple to the non-inverting input of amplifier 500. Resistor 510 also couples to ground 512. Resistor 514 forms part of a negative feedback loop that couples a node 516 on the output of the amplifier 500 to the inverting input of amplifier 500. The node 516 couples to a resistor 518, which, in turn, couples to a node 524. Also coupling to the node 524 are the resistor 528 and node 526. The prior regulation signal 130 couples to node 526 via a resistor 520. Node 526 couples to the inverting input of amplifier 502, and the non-inverting input of the amplifier 502 couples to ground 512. The resistor 528 couples to node 530 at the output of the amplifier 502. The node 530 couples to the inverting input of the amplifier 504, and the non-inverting input of the amplifier 504 couples to ground 512. The output of the amplifier 504 is the regulation signal 112 ($V_{REG\_O}$) that is output by the controller logic 102.

As explaned above, the constant K used in equation (1) may be set as desired in the controller logic 102. The constant K is determined as follows:

$$\frac{\text{Resistor } 514}{\text{Resistor } 506} = \frac{\text{Resistor } 510}{\text{Resistor } 508} = K \quad (2)$$

where "resistor 506," "resistor 508," "resistor 510," and "resistor 514" are corresponding resistance values, assuming that $$\text{Resistor } 518 = \text{Resistor } 520 = \text{Resistor } 528 \quad (3)$$

where "resistor 518," "resistor 520" and "resistor 528" are corresponding resistance values. The resistances in equation (2) may be adjusted as necessary to produce desired K values, assuming that equation (3) is true. The schematic shown in FIG. 5 does not limit the scope of the disclosure, and other circuit configurations that accomplish the objectives of the controller logic 102 as described here are contemplated and fall within the scope of the disclosure.

Figure 6:
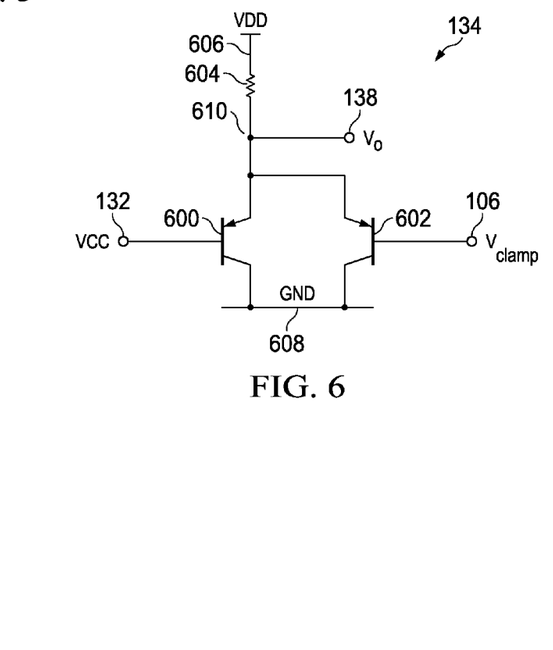
FIG. 6 is a circuit schematic of output driver limiter logic.

FIG. 6 is a circuit schematic of output driver limiter logic 134. The limiter logic 134 receives $V_{CC}$ supply rail 132, $V_{DD}$ supply rail 606 (e.g., an internal supply of the limiter logic 134), and clamp signal 106 as inputs. It couples to ground 608 and provides as an output the control signal 138 ($V_O$) that is provided to the controller logic 102. The limiter logic 134 includes transistors (e.g., bipolar junction transistors) 600 and 602 and a resistor 604. One end of the resistor 604 couples to the supply rail 606, and the other end of the resistor 604 couples to node 610. Node 610 is the point at which the control signal 138 is produced. Node 610 couples to the emitter of transistor 600 and to the emitter of transistor 602. In at least some embodiments, the transistors 600, 602 are p-n-p transistors, although the scope of disclosure is not limited as such. The base of the transistor 600 couples to supply rail 132, while the base of the transistor 602 couples to the clamp signal 106. The collectors of the transistors 600, 602 both couple to ground 608. In operation, the control signal 138 is clamped either by the supply rail 132 or the clamp signal 106, depending on which one is lower. The schematic shown in FIG. 6 does not limit the scope of the disclosure, and other circuit configurations that accomplish the objectives of the limiter logic 134 as described here are contemplated and fall within the scope of the disclosure.

Numerous other variations and modifications will become apparent to those skilled in the art once the above disclosure is fully appreciated. It is intended that the following claims be interpreted to embrace all such variations, modifications and equivalents. In addition, the term "or" should be interpreted in an inclusive sense.

What is claimed is:

1. A switched mode power supply, comprising:
   a synchronous rectification transistor switch including a gate; and
   an output driver coupled to said gate and providing a driving signal to the gate, said driving signal determined based on a dynamically controllable clamp signal and a prior driving signal, wherein the output driver comprises controller logic and out stage logic, wherein an output of the out stage logic is coupled to an input of the controller logic and the gate of the transistor switch, and wherein an output of the controller logic is coupled to a second input of the controller logic and an input of the out stage logic.

2. The power supply of claim 1, wherein the output driver comprises a storage element that provides said prior driving signal.

3. The power supply of claim 1, wherein the clamp signal is determined based on electrical characteristics of the transistor switch.

4. The power supply of claim 1, wherein the clamp signal is determined based on a threshold voltage range at said gate.

5. The power supply of claim 1, wherein the clamp signal is determined based on an output current of the power supply.

6. The power supply of claim 1, wherein the output driver generates a regulation signal that is used in tandem with a pulse signal to generate the driving signal.

7. The power supply of claim 6, wherein the output driver uses the clamp signal, said prior driving signal, and a prior regulation signal to generate said regulation signal.

8. The power supply of claim 7, wherein the prior driving and regulation signals are obtained from storage elements using switches that are opened and closed based on said pulse signal.

9. The power supply of claim 7, wherein, to generate the regulation signal, the output driver determines a sum of the prior regulation signal and a product, said product determined by multiplying a constant by a difference between the clamp signal and said prior driving signal.

10. The power supply of claim 9, wherein said clamp signal and said driving signal have voltages that are less than a power supply rail voltage provided to the output driver.

11. An output driver for controlling a synchronous rectification transistor switch, comprising:
    controller logic that, at a first time instance, receives and uses a dynamically controllable setpoint signal, a prior driving signal, and a prior regulation signal to generate a new regulation signal that is stored in a storage element; and
    out stage logic that, at a next time instance, receives and uses said new regulation signal from the storage element and a pulse signal to generate a new driving signal usable to control said synchronous rectification transistor switch, wherein an output of the out stage logic is coupled to an input of the controller logic to provide the prior driving signal to the controller logic and is configured to couple to a gate of the synchronous rectification transistor switch, and wherein an output of the controller logic is coupled to a second input of the controller logic and an input of the out stage logic.

12. The output driver of claim 11, further comprising limiter logic that receives and uses a dynamically controllable clamp signal and a rail voltage signal to generate said setpoint signal, the generated setpoint signal associated with a lesser of the clamp and rail voltage signals.

13. The output driver of claim 11, wherein said setpoint signal is a dynamically controllable clamp signal.

14. The output driver of claim 11, further comprising second and third storage elements that store the prior driving and regulation signals, respectively.

15. The output driver of claim 11, further comprising a first switch coupled between said controller logic and said first storage element, a second switch coupled in series between the out stage logic and the second storage element, and a third switch coupled in series between the third storage element and a node to which the first storage element couples.

16. The output driver of claim 15, wherein the first switch is open when the second and third switches are closed, and wherein the first switch is closed when the second and third switches are open.

17. The output driver of claim 16, wherein:
the first, second and third switches are controlled by said pulse signal,
when the pulse signal opens the first switch and closes the second and third switches, the out stage logic determines said new driving signal based on the new regulation signal stored in the storage element, and
when the pulse signal closes the first switch and opens the second and third switches, the out stage logic determines said new driving signal using ground.

18. The output driver of claim 11, wherein, to determine the new regulation signal, the controller logic determines a sum of the prior regulation signal and a product, the product being a result of multiplying a constant by a difference between the dynamically controllable setpoint signal and the prior driving signal.

19. An output driver for controlling a transistor switch in a switched mode power supply, comprising:
controller logic having a controller output coupled to a first switch that couples to a first storage element; and
out stage logic having an out stage input coupled to said first storage element, a different out stage input receiving a pulse signal, and an out stage output coupled to a second switch that couples to a second storage element, said second storage element couples to a controller input,
wherein the first storage element couples to a third switch that couples to a third storage element, the third storage element couples to another controller input,
wherein, when the first switch is closed and the second and third switches are open, the controller logic uses a dynamically controllable setpoint signal, a voltage of the second storage element and a voltage of the third storage element to generate a regulation signal that is provided to the first storage element via the controller output and the first switch,
wherein, when the first switch is open and the second and third switches are closed, a voltage of the first storage element is provided to said third storage element via the third switch and to said out stage input, the out stage logic provides a driving signal on the out stage output based on the voltage of the first storage element and said pulse signal, and said driving signal is provided to the second storage element, and
wherein the driving signal is usable to control a switched mode power supply switch.

20. The output driver of claim 19, further comprising limiter logic that receives a dynamically controllable clamp signal and a rail voltage signal and provides the setpoint signal to said controller logic based on a lesser of the dynamically controllable clamp signal and the rail voltage signal.

* * * * *